(12) United States Patent
Elango et al.

(10) Patent No.: US 11,036,476 B2
(45) Date of Patent: Jun. 15, 2021

(54) SYSTEMS AND METHODS FOR BUILDING AN APPLICATION FROM A CONSOLE

(71) Applicant: VMWARE, INC., Palo Alto, CA (US)

(72) Inventors: Chandra Elango, Palo Alto, CA (US); Thirupati Panyala, Palo Alto, CA (US); Saurabh Deswal, Bangalore (IN); Anantha Kalyan Kumar Mulampaka, Atlanta, GA (US); Avon Puri, Palo Alto, CA (US)

(73) Assignee: VMWARE, INC., Palo Alto, CA (US)

( * ) Notice: Subject to any disclaimer, the term of this patent is extended or adjusted under 35 U.S.C. 154(b) by 139 days.

(21) Appl. No.: 16/215,682

(22) Filed: Dec. 11, 2018

(65) Prior Publication Data

US 2020/0042293 A1 Feb. 6, 2020

(30) Foreign Application Priority Data

Aug. 3, 2018 (IN) .............................. 201841029333

(51) Int. Cl.
| | | |
|---|---|---|
| *G06F 9/44* | (2018.01) | |
| *G06F 8/34* | (2018.01) | |
| *G06F 9/54* | (2006.01) | |
| *G06Q 10/06* | (2012.01) | |
| *G06F 8/38* | (2018.01) | |
| *G06F 8/71* | (2018.01) | |

(52) U.S. Cl.
CPC .................. *G06F 8/34* (2013.01); *G06F 8/38* (2013.01); *G06F 8/71* (2013.01); *G06F 9/54* (2013.01); *G06Q 10/0633* (2013.01)

(58) Field of Classification Search
CPC ........................................................ G06F 9/44
See application file for complete search history.

(56) References Cited

U.S. PATENT DOCUMENTS

| 7,546,522 B2* | 6/2009 | Tolle ...................... G06F 40/186 |
| | | 715/215 |
| 8,788,935 B1* | 7/2014 | Hirsch ...................... G06F 8/10 |
| | | 715/234 |
| 9,645,914 B1* | 5/2017 | Zhang ........................ G06F 8/65 |
| 2007/0156742 A1 | 7/2007 | Gonzalez |
| 2007/0157096 A1 | 7/2007 | Keren |
| 2007/0245238 A1* | 10/2007 | Fugitt ................... G06F 3/0481 |
| | | 715/700 |
| 2009/0024937 A1* | 1/2009 | Lauff ........................ G06F 8/20 |
| | | 715/762 |
| 2009/0164604 A1 | 6/2009 | Merissert-Coffinteres |

(Continued)

*Primary Examiner* — Jae U Jeon
(74) *Attorney, Agent, or Firm* — Clayton, McKay & Bailey, PC

(57) ABSTRACT

Examples are disclosed for building an application from a console. The application can be built by first identifying or otherwise receiving data connectors from one or more sources. The data connectors can be associated with abstractions, such as common business objects. The common business objects can then be used to build the application. For example, an application template can include various data fields. Each data field can be associated with a particular common business object, thereby tying the data field to a data connector. Once published, the application can display data from the relevant data connector in the accompanying data field. Different application versions, each using a different application template, can be created for different user groups.

19 Claims, 10 Drawing Sheets

(56) References Cited

U.S. PATENT DOCUMENTS

| | | |
|---|---|---|
| 2010/0325605 A1 | 12/2010 | Ding |
| 2011/0208786 A1* | 8/2011 | Ghosh .................... G06Q 10/10 707/805 |
| 2015/0178263 A1* | 6/2015 | Meschkat ............. G06F 40/186 715/235 |
| 2017/0140465 A1 | 5/2017 | Stouse |
| 2018/0189035 A1 | 7/2018 | Narang |

* cited by examiner

SYSTEMS AND METHODS FOR BUILDING AN APPLICATION FROM A CONSOLE

RELATED APPLICATIONS

Benefit is claimed under 35 U.S.C. 119(a)-(d) to Foreign Application Serial No. 201841029333 filed in India entitled "SYSTEMS AND METHODS FOR BUILDING AN APPLICATION FROM A CONSOLE", on Aug. 3, 2018, by VMware, Inc., which is herein incorporated in its entirety by reference for all purposes.

The present application is related in subject matter to U.S. patent application Ser. No. 16/215,686, which is incorporated herein by reference.

BACKGROUND

Applications can boost productivity by providing a convenient interface for performing tasks more efficiently than would otherwise be possible. For example, an application can aggregate information in one location, quickly receive user input, and instantly communicate with remote servers or individuals on behalf of the user. Many repetitive tasks required in the workplace could be streamlined—or even eliminated—by an application targeting those specific tasks.

Along with the obvious upsides to applications come significant downsides. One such downside is cost. In order to streamline an employee's workflow, for example, an enterprise would need to invest substantial resources to develop an application from scratch to handle that workflow. In some cases, the enterprise could purchase an existing solution, but that existing solution might be costly and may still fail to adequately address the specific workflow at issue.

Another downside to the current use of applications is the lack of flexibility. An enterprise could purchase an application for tracking sales, for example, but that application is unlikely to be adaptable to other non-sales-specific tasks. The lack of flexibility can make an application financially unviable by providing an inadequate productivity boost relative to the cost of the application.

As a result, a need exists for systems and methods for building an application from a console. The systems and methods for building the application should be flexible and easy to use, allowing an administrator to create multiple versions of applications for different types of employees or workflows in the enterprise. The systems and methods should allow an administrator to build the applications quickly and easily, without the need to write code, fix bugs, and perform other advanced software-development techniques.

SUMMARY

Examples described herein include systems and methods for building an application from a console. Although the term "console" and the phrase "from a console" are used through the disclosure, they are not intended to be limiting. A console can be any graphical user interface ("GUI") that can be used to build an application without requiring a user to directly write or compile code.

In a first example, a method is provided for building an application at a computing device. The method can include identifying a first data connector from a first source. The data connector can be associated with an Application Programming Interface ("API"), provided by the first source, that allows other parties to remotely retrieve data from the first source. The source can make available a wide array of data connectors that provide raw data, which can be used at the discretion of the receiving party.

The method can also include associating the first data connector with a first common business object. The first common business object can represent a concept, such as "total monthly sales." The association, or "mapping," can tie the first data connector with the first common business object. Continuing the example, the "total monthly sales" common business object can be mapped to a data connector that provides data regarding the total monthly sales. The common business object can be stored after creation for use as part of an application.

Each type of mapping (between the data connector and object in one instance, and between the object and data field in another instance), the mapping can be based on user input received at the GUI. In some examples, however, the system can automatically suggest a mapping based on contextual or historical data. The user can choose to accept or decline the suggestion as necessary.

The method can further include providing an application template having multiple data fields. A data field in the application template, such as "text field 1," can be associated with a common business object. When the application is generated, published to the relevant users, and executed, that data field will display information associated with the common business object, which in turn is associated with a data connector from the source. In other words, data from the source's data connector can be displayed in the relevant data field of the application when the application executes. In this way, a custom application GUI can be populated with information from one or more data objects.

Multiple application templates can be made available for any particular application. In some examples, the application templates can differ based on the intended user or user group. A single application can be used across different user groups, with each user group receiving a tailored version of the application that utilizes an application template specific to the user group. For example, a salesperson can receive an application utilizing a template that prominently displays detailed information about specific customers. Similarly, a sales manager can receive an application utilizing a template that prominently displays more general, higher-lever sales information.

The user building the application, such as an administrator, can also select between various visual themes for the application. The themes can impact the color and formatting of the application. The themes can cause data fields, headers, or any other text or image elements to be displayed in various locations and in varying sizes and text types within the application.

In another example, a second method is provided for building an application at a computing device. While similar to the first example method, the second example method is more focused on various interactions between a user and a GUI during the process of building the application.

The second method can include providing a GUI and displaying, within a first view of the GUI, a first set of graphical elements corresponding to data connectors from a first source. The method can also include displaying, within the first view of the GUI, a set of common business objects.

The method further includes receiving a user selection of a first graphical element—representing the first data connector—from the first set of graphical elements, as well as a user selection of a common business object. The user selections can be performed by clicking each of the first graphical element and common business object, by dragging and dropping the first graphical element onto the common business object (or vice versa), or by responding to a prompt or other automated suggestion for the selection. Based on the user selection, the method can include mapping the first data connector to the selected common business object.

The method can also include a second view of the GUI, upon which an application template can be displayed. The application template can include multiple template fields that are mappable to one or more common business objects. The user can select a first template field a common business object. Again, this can by done by clicking each element individually, by dragging and dropping one element onto the other, or by responding to a prompt or suggestion. Based on the selection, the method can include mapping the common business object to the first template field.

The method can also include generating an application that, when executed, displays data in the first template field corresponding to the first data connector. The first template field and first data connector can both be mapped to the same common business object.

The example methods summarized above can be incorporated into a non-transitory, computer-readable medium having instructions that, when executed by a processor associated with a computing device, cause the processor to perform stages for building an application. Additionally, the example methods summarized above can be implemented in a system including, for example, a computing device and an application server.

Both the foregoing general description and the following detailed description are exemplary and explanatory only and are not restrictive of the examples, as claimed.

DESCRIPTION OF THE EXAMPLES

Reference will now be made in detail to the present examples, including examples illustrated in the accompanying drawings. Wherever possible, the same reference numbers will be used throughout the drawings to refer to the same or like parts.

Examples are disclosed for building an application from a console. The application can be built by first identifying or otherwise receiving data connectors from one or more sources. The data connectors can be associated with abstractions, such as common business objects. The common business objects can then be used to build the application.

For example, an application template can include various data fields. Each data field can be associated with a particular common business object, thereby tying the data field to a data connector. Once published, the application can display data from the relevant data connector in the accompanying data field. Different application versions, each using a different application template, can be created for different user groups.

Figure 1:
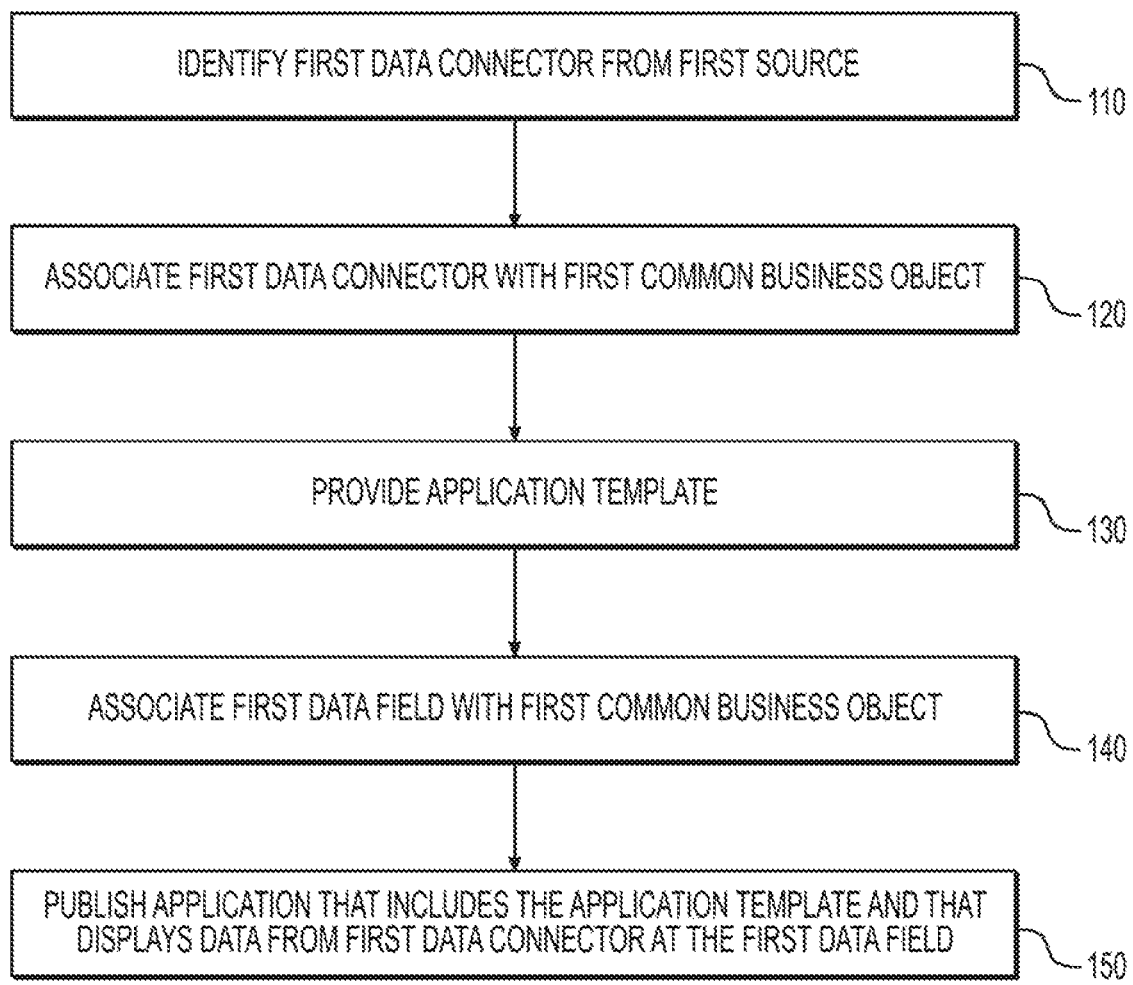
FIG. 1 is a flowchart of an example method for building an application from a console.
Figure 2:
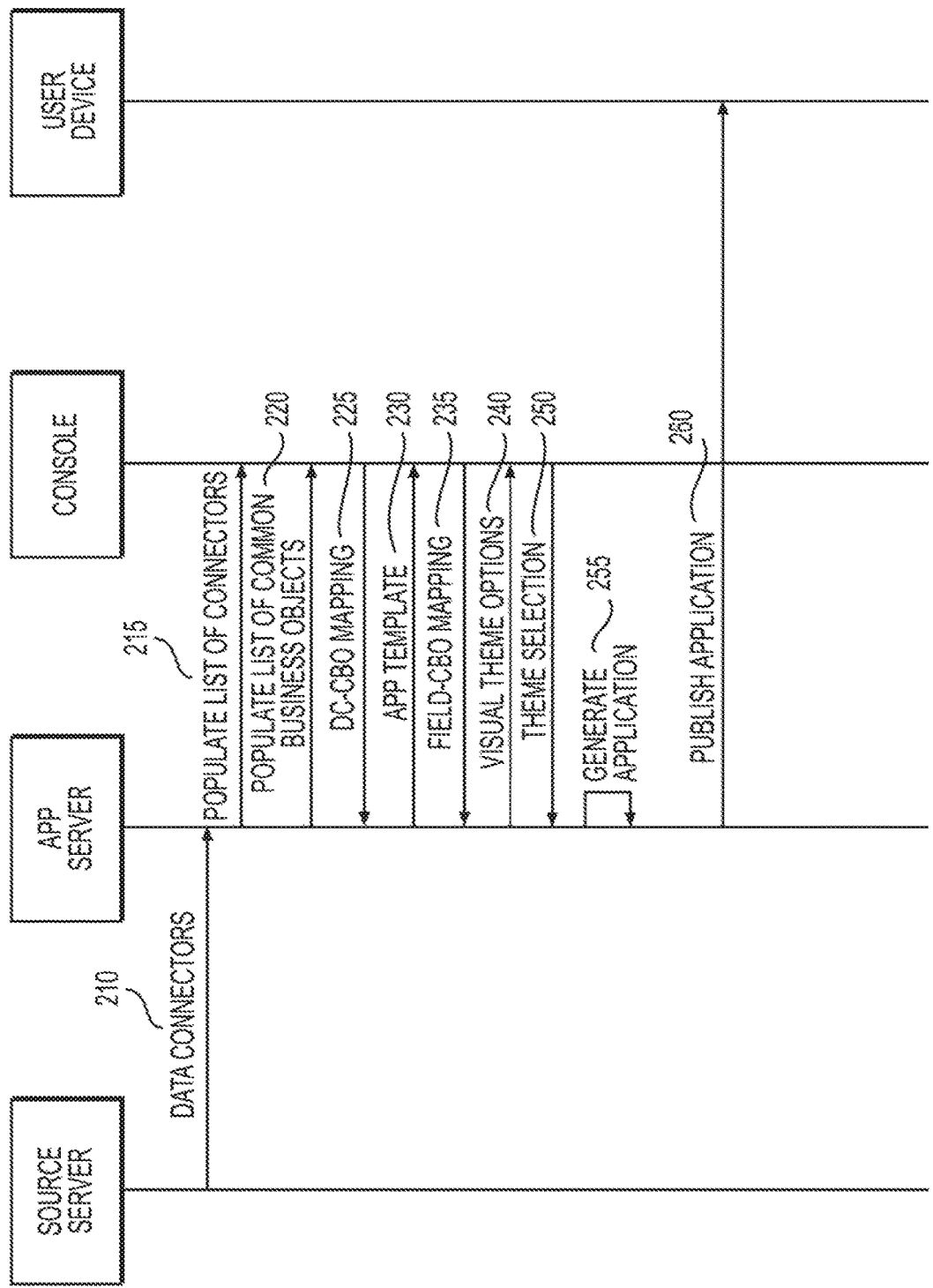
FIG. 2 is a sequence diagram of an example method for building an application from a console.
Figure 3:
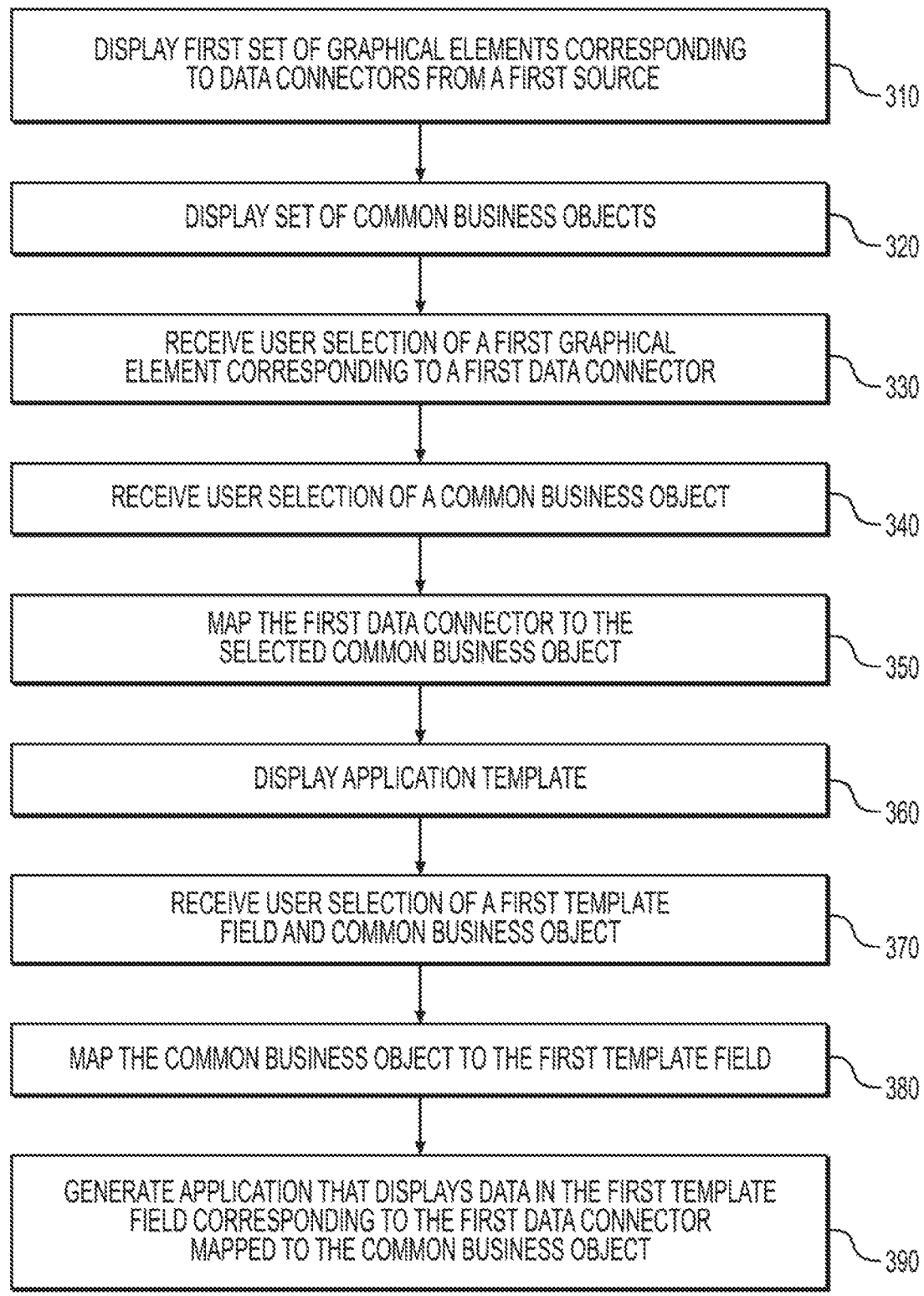
FIG. 3 is a flowchart of an example method for building an application from a console.

FIG. 1 provides a flowchart of a first example method for building an application. FIG. 2 provides a sequence diagram showing a more detailed version of an example method for building an application. FIG. 3 provides a flowchart of an example method for building an application that includes GUI interactions. FIGS. 4-9 are illustrations of example GUIs for building an application. FIG. 10 is a system diagram for performing the example methods disclosed herein.

Turning to FIG. 1, stage 110 can include identifying a first data connector from a first source. This stage can include selecting a source. The source can be any service that provides data which is available on demand. For example, the source can provide data in response to one or more API calls made by a remote server. Example sources include SALESFORCE, VARICENT, CONCUR, COUPA, and JIRA. Each discrete data channel from a source can be considered a "data connector" for the purpose of this disclosure. A source can provide a single data connector or multiple data connectors.

For example, SALESFORCE can provide multiple data connectors that can be obtained through various API calls. Example data connectors relating to account information can include, for example, "UUID" (universally unique identifier), "account_id," "account_name," "description," "email," "phone," "title," "total_opportunities," "no_of_employees," and "total_amount." There is no limit to the number of data connectors made available by a source. Similarly, there is no limit to the type or granularity of the available data connectors. Although FIG. 1 describes an example with a single source, multiple sources can be selected and incorporated into a single application build.

Stage 110 can include importing all available data connectors from an identified source. The importation can be performed automatically, based on the user identifying the source. In some examples, and as discussed further with respect to FIG. 6, the available data connectors can be imported and displayed on a GUI that allows further interaction with the connectors to build an application. The system can identify a first data connector by importing and displaying the data connector at a console. Although the term "console" and the phrase "from a console" are used throughout the disclosure, they are not intended to be limiting. A console can be any GUI that can be used to build an application without requiring a user to manually write or compile code.

Stage 120 can include associating the first data connector with an abstract object, referred to herein as a common business object. A common business object can be an abstract class that gets implemented based on user selections, or some other object with no initial definition or associated data source. For example, a new object can be created that implements an abstract class and defines connectors based on selections by the user. Despite the nomenclature used herein, a common business object is not limited to any particular type or object, data, or usage. Multiple common business objects can be made available at a console, providing the user with the flexibility to associate any of those common business objects with any data connector, as desired. In some examples, the common business objects are given names or identifiers intended to match the names or identifiers used for data connectors. For example, a common business object can be named "Account ID." A user can choose to associate the "Account ID" common business object with an "account_id" data connector.

The association at stage 120 can be performed manually by a user or automatically by the system. In one example—and as described in more detail with respect to FIG. 6—a GUI can display one or more graphical elements representing one or more data connectors identified at stage 110. The GUI can also display one or more graphical elements representing one or more common business objects. The user can manually associate a data connector with a common business object by selecting a graphical element associated with the data connector and selecting a graphical element associated with the common business object. This can include clicking once on each graphical element or dragging-and-dropping one graphical element to the other, for example. The respective graphical elements can be highlighted on the GUI when selected, when associated with another graphical element, or both.

In some examples, stage 120 can include automatically associating a data connector with a common business object. In one example, a user can select a data connector and the system can automatically determine the most relevant common business object and perform the association. The determination can be made by comparing the name of the common business object (e.g., "Account ID") with the name of the data connector (e.g., "account_id"). Even when an association is performed automatically, the user can confirm or change the association as desired.

Stage 130 of the method can include providing an application template for the application being built. As explained in more detail with respect to FIGS. 7 and 8, the application template can be a template that includes various fields that can be configured to display text or image information. Multiple application templates can be provided. Application templates can differ based on, for example, the number of fields included in the template, the position of the fields, the size of the fields, whether the fields are text-, image-, or graph-based. In some examples, a different application template is designated for different types of users. In that example, the different users can each execute what appears to be the same application, but in fact execute a version of the application tailored to that user.

The user building the application at the console (referred to throughout as an "administrator") can select an application template at stage 130. Stage 140 can include associating a first data field of the application template with the first common business object (the first common business object being previously associated with the first data connector at stage 120). The association at stage 140 can be performed in a manner similar to the association at stage 120. For example, a GUI view can display relevant data fields from the application template, such as "title," "subtitle," "label," "value," and "image." The particular data fields displayed can be selected based on the template, or portion of the template, at issue. For example, a template can include multiple sections, where each section corresponds to a predetermined set of data fields.

The user can select a section of the template and the GUI can display the associated set of data fields. The GUI can also display common business objects available to be mapped to the data fields. In some examples, only the common business objects that have been associated with data connectors are displayed on the GUI at stage 140. In other examples, more common business objects are displayed at this stage. To perform the association, a user can select a graphical element associated with a data field and then select a graphical element associated with the common business object. As in stage 120, the selections can be made by clicking or tapping each of the relevant graphical elements or by dragging and dropping one graphical element onto the corresponding graphical element.

Stage 150 can include publishing the application being built at stages 110-140. This stage can include generating the application or updating a previously generated application. It can also include pushing the application to a user device, either directly or by instructing the user device to retrieve the application from a server. The application, once executed, can include the application template provided at stage 130. The application template can display data from the first data connector in the first data field based on the associations made at stages 120 and 140.

When executing, the application can constantly or intermittently update data values (or other information) displayed in the various fields of the application. For example, an application can include a first field showing a daily total sales amount and a second field showing a line graph of historical sales total for the current year. The application can update the first and second fields by using one or more API calls to the relevant data source(s) requesting updated data and then updating the field to reflect the new data. The API calls can be made from the application server and then pushed down to the application instance executing on a user device. In some examples, the application server requests data updates from a source regularly, such as once per minute. If the application itself is requesting data updates from a source, it can do so on a regular basis or whenever the application is opened or reopened.

In one example, a Register API can be used to register a specified endpoint for polling. The endpoint can be an endpoint at which to retrieve the data, such as cloud server associated with the source, for example. When new data is found, the endpoint can be called. A callback endpoint can also be identified. The callback endpoint can be a location, such as an application server URL, where the new data can be sent. Data can be transmitted in the form of normalized objects, such as JSON objects, in one example. The application server can transform the normalized objects into common business objects or other data models. A transformation library can be used for these transformations.

In some examples, the source can provide a notification to the application server or application instance when a change is registered at a data connector. For example, the data source can determine that a value associated with a "total_sales" data connector has changed. As a result of determining that change, the data source can send a message or notification to the application server, identifying the data connector and indicating that a change has been made. The application server can then make an API call to the source to retrieve the updated value of the data connector. The application server can then push the updated value to any relevant application instances installed on user devices.

An application executing on a user device need not store any state information regarding the various fields displayed by the application. Instead, the application can simply render what is provided at runtime from an application server or other cloud location.

FIG. 2 provides a sequence diagram of an example method for building an application from a console. Stage 210 of the method can include receiving data connectors from a source server at an application server. This stage can include selecting a source through the console. The console can be a user interface for interacting, directly or indirectly, with the application server. An administrator can select from a predetermined list of sources or manually enter a new source. For example, the administrator can enter a web location, IP address, or server identification information in order to identify the source. For the sources on the predetermined list of sources, the relevant connection information can automatically populate, allowing for an easy selection of the source. The user can identify a single source or multiple sources.

After a source has been identified, the data connectors for that source can be imported or otherwise loaded at stage 210. In some examples, such as when the source is already known to the application server, the data connectors may already be saved at the application server. In that case, the application can load the saved data connectors at stage 210. Otherwise, the data connectors can be imported from the source server at this stage. In some examples, importing involves making an API call to the source server, the API call requesting a list of data connectors.

At stage 215, the application server can populate a list of data connectors for one or more sources and display the list at the console. For each data connector, the application server can use an identifier that matches an identifier provided by the source server. In some examples, however, the application server can rename a data connector as desired. For example, a data connector with a long identifier can be displayed with a truncated identifier. In another example, the application server can rename an identifier based on common abbreviations or nomenclature (such as by shortening "application" to "app"). The list of data connectors can be displayed as discrete graphical elements on the console GUI at stage 215.

At stage 220, the application server can populate a list of common business objects. The common business objects can be displayed as discrete graphical elements on the console GUI. In some examples, the graphical elements representing the common business objects can be displayed in the same GUI view as the graphical elements representing the data connectors. This is shown and further described in FIG. 6, for example.

At stage 225, an administrator can use the console to provide mappings between one or more data connectors and one or more common business objects (referring to in FIG. 2 as "DC-CBO mappings"). In some examples, the mappings are provided in a one-to-one manner, with each mapped data connector being associated with only one common business object. However, a single data connector can be associated with multiple common business objects. Similarly, a single common business object can be mapped to multiple data connectors in an example.

The mappings can be selected manually by the administrator or automatically by the console or application server. In some examples, mappings can be suggested to the administrator, who can then decide whether to accept or decline the suggestion. A manual selection can be made by, for example, selecting a graphical element associated with a data connector and then selecting a graphical element associated with a common business object. These selections can be reversed in some examples. Upon selecting a corresponding set of at least one data connector and at least one common business object, the GUI can display a confirmation of the mapping. For example, the GUI can display the mapped elements in a different color or include text, an icon, or other graphics indicating the mapping.

In some examples, when the administrator selects an available data connector, the console suggests one or more common business objects for mapping. For example, the administrator can select a data connector called "account_id." In response, the console can prompt the administrator to associate that data connector with a first common business object called "Account ID," a second common business object called "User ID," a third common business object called "Account," or some combination thereof. The suggestion can be provided in a prompt displayed on the GUI. Based on the response from the administrator, the corresponding mappings can be made. The mappings can be communicated to the application server in real time, as they are made, or after an administrator selects an option to save the mappings.

At stage 230, the application server can display one or more application templates at the console. In one example, the application server selects a template based on input from the administrator regarding a type of user for which the application is intended. The administrator can specify that the application is for employees in the sales group of an enterprise, for example. The application server can select an application template that is tailored to, or otherwise appropriate for, the sales group at stage 230. In some examples, the application server can provide multiple application templates to the console. The administrator can then choose between the templates.

An application template can include multiple fields. A field can be a placeholder within the template within which, during execution of the application, text, icons, images, or other graphical elements are displayed. Fields can have a field type, such as a text-type or image-type, that dictates the type of information to be displayed within that field. Different application templates can include different fields and different field types. For example, an application template for an approval-based application can include fields related to approvals. These fields can include, for example, a field for the name of an individual making a request, a field for that person's job title, a field describing the request, a field for an "approve" button, and a field for a "decline" button. In another example, an application template for a sales-based application can include fields related to sales. Example fields can be provided for a customer name, a customer account status, a pipeline report, and sales.

Additionally, multiple templates can be provided for a single type of application. An administrator can select one of the multiple templates for the application, as desired. In some examples, the administrator can select multiple templates for the application, with the intention that each template will correspond to a different application version. In some examples, different versions of a single application can be made available to different users based on criteria such as the user group or organizational group to which the user belongs. As a more specific example, a developer may benefit from an application template that includes granular detail about that user's upcoming deadlines in JIRA. Meanwhile, a development manager can benefit from an application template that includes higher-level detail regarding the overall progress of teams or groups within the same JIRA system. In some examples, the administrator selects a type of user and, at stage 230, the application server provides an application template tailored to that type of user.

At stage 235, the administrator can select mappings between the fields of an application template and common business objects (referred to in FIG. 2 as "field-CBO mappings"). Fields can be displayed in a GUI of the console based on the administrator's selection of a template or a portion of a template. For example, the administrator can select a box of the template that includes multiple fields, and in response, the console can display graphical elements associated with the fields in that box.

In some examples, the mappings are provided in a one-to-one manner, with each mapped field being associated with only one common business object. However, a single field can be associated with multiple common business objects. Similarly, a single common business object can be mapped to multiple fields in an example.

The mappings can be selected manually by the administrator or automatically by the console or application server. In some examples, mappings can be suggested to the administrator, who can then decide whether to accept or decline the suggestion. A manual selection can be made by, for example, selecting a graphical element associated with a field and then selecting a graphical element associated with a common business object. These selections can be reversed in some examples. Upon selecting a corresponding set of at least one field and at least one common business object, the GUI can display a confirmation of the mapping. For example, the GUI can display the mapped elements in a different color or include text, an icon, or other graphics indicating the mapping.

In some examples, when the administrator selects an available data field, the console suggests one or more common business objects for mapping. For example, the administrator can select a field called "name." In response, the console can prompt the administrator to associate that field with a first common business object called "Customer Name," a second common business object called "Contact," or both. The suggestion can be provided in a prompt displayed on the GUI. Based on the response from the administrator, the corresponding mappings can be made. The mappings can be communicated to the application server in real time, as they are made, or after an administrator selects an option to save the mappings.

At stage 240, the application server can cause the console to display visual theme options for the application being built. The visual theme options can apply to any portion of the application being built, such as the background color, text color, text size, text font, and the location of text or images or other fields. A theme can be selected at the console and communicated to the application server at stage 250.

The application server can provide an application preview to the administrator at any time during the process of building the application. The application preview can be displayed in a GUI intended to mimic a GUI on a user device executing the application. For example, when the user selects a visual theme, the application preview can reflect that visual theme. This can allow the administrator to try out different themes before committing to one. The preview can be displayed at earlier stages of the method as well. For example, an application preview can be displayed when the administrator selects an application template at stage 230. In some examples, the application preview can include real-time data obtained from the data connectors and displayed in the relevant fields of the application template. The application preview can be displayed in a new GUI window or in a portion of the GUI being used to build the application at the console.

At stage 255, the application server can generate the application based on the various inputs from the administrator. This stage can include generating or retrieving multiple components of code. The application server can store or access code snippets that accomplish particular tasks and then edit and combine those snippets as needed. For example, the generic code for mapping a data connector to a common business object can be stored at the application server.

When generating the application at stage 255, the application server can access the generic code and substitute a specific data connector and common business object into that piece of code. This process can be repeated for the various mappings provided by the console. A similar process can take place for the template selection, where the application server can access code representing one of multiple templates based on selections at the console. The application server can also access code implementing a particular visual theme, as selected at the console. The various snippets of code can be compiled into one functioning application (including, in some examples, multiple application versions for different user groups).

In some examples, "generating" the application includes modifying a previously generated application. For example, an administrator can use the console to make a small change or tweak to an existing application. When the administrator saves those changes or otherwise instructs the application server to implement the changes, the server can change only those portions of the application that have changed since the last build. For example, if the administrator only changes the visual theme, then the application server can substitute code portions that control the relevant visual aspects of the application without modifying the remaining code.

At stage 260, the application server can publish the application to a user device. This stage can include transmitting—or instructing a management server or other server to transmit—the application to one or more user devices. In some examples, an administrator can create an application that is available to a single user device. In other examples, the administrator can create an application that is available to multiple user devices, such as a group of users or user devices. Various groups available to an administrator can be saved at the management server or application server, or both. Alternatively, the administrator can create a new group to which an application should be made available. In one example, the console allows the administrator to select between various groups already saved at the management server.

As part of stage 260, the application server can transmit the application to a relevant user device. The term "transmit" is not intended to be limited to directly sending the application to the user device. In some examples, the application can be stored at a location accessible to the user device, and the user device can retrieve the application. For example, the application can be stored in a command queue associated with the user device, such as at a management server. An instruction can then be transmitted to a messaging service associated with the platform of the target user device. The instruction can request that the messaging service send an instruction to the user device to check in with the management server or otherwise determine whether the command queue contains any commands or instructions. If the application is stored in, or identified by, the command queue, the user device can retrieve it by downloading and executing the contents of the command queue.

Authentication techniques can be employed at multiple levels, including authentication for an administrator using the console as well as for users running an instance of a built application on their user device.

With respect to administrators using the console to access the application server, an identity management service can be utilized. An example identity management service is VMWARE IDENTITY MANAGER ("vIDM"). The term "vIDM" is used herein to mean any identify management service and is not limited to the VMWARE IDENTITY MANAGER. The authentication process can use a token, such as an OAuth token or JSON Web Token ("JWT"). The token can be validated using a vIDM tenant public key, with the private key stored at the vIDM server. The vIDM token can include a tenant ID that can be passed down to the console platform for every request. In some examples, all API requests must validate the tenant ID. When an administrator attempts to login to the console, the console needs to know the administrator's vIDM tenant URL so that it can redirect to the login page. The application server web URL can look up the vIDM URL from a database using a context path. For example, the context path "https://appbuilder.vmware.com/acme" can redirect to an ACME vIDM instance URL, provided there is a database record for ACME in a relevant tenant configuration table.

With respect to a user executing a built application on a user device, the application can authenticate the user through vIDM and provide a JWT token (or another token/certificate) that persists on the device. The token can be used in the authentication for all application-server APIs. For example, the token can be passed to the application server and subsequently to the data connector. The token can be validated with the vIDM public key for each tenant. The token can contain the tenant ID, which is used to identify the tenant to which the user belongs.

An authorization service can provide an API used to authenticate a user with different cloud services (i.e., sources) that are federated by the vIDM. This API can be protected using a vIDM token, such as a JWT token. The API can be configured to accept a list of data-connector IDs to authenticate. The authorization service can authenticate on behalf of the user, and once the user is authenticated the service can store tokens on behalf of the user. The authorization service can also refresh these tokens on behalf of the user as needed. In some examples, the authorization service is an identity manager such as vIDM. In other examples, the authorization service is the application server, discussed more below.

As mentioned earlier, an administrator can use a GUI at a console to build an application. FIG. 3 provides a flowchart of an example method involving the use of GUI elements to build the application. Stage 310 of the method can include displaying a first set of graphical elements corresponding to data connectors from a first source. The graphical elements can be displayed on a first view of a GUI at the console, for example. As explained above, each data connector can represent a discrete data channel from a source. In some examples, a single graphical element is displayed to represent a single data connector.

The data connectors can be displayed at stage 310 in response to the administrator selecting one or more sources. For example, the administrator can select from multiple available sources, such as SALESFORCE, VARICENT, and JIRA, and the GIU can display graphical elements representing the various data connectors offered by that source. In some examples, the data connectors are displayed in a tiered format. In that scenario, a single graphical element can represent a tier corresponding to multiple data connectors. The administrator can select the graphical element associated with the tier in order to expand that tier to display the data connectors within the tier, each of which can be represented by an individual graphical element.

Stage 320 can include displaying a set of common business objects. For example, the GUI can display a set of graphical elements corresponding to common business objects. As with the data connectors, the common business objects can be tiered. For example, the common business objects can be organized into a first tier for "team performance," a second tier for "pipeline," a third tier for "customer accounts," and so on. The administrator can select a graphical element associated with a tier to expand the tier and display additional graphical elements within the tier. The additional graphical elements can correspond to additional tiers or to the common business objects themselves, based on the organization of the common business objects provided by the application server. In some examples, the graphical elements displayed at stage 310 (representing the data connectors) and the graphical elements displayed at stage 320 (representing the common business objects) can be displayed on the same GUI view, such that both are simultaneously visible to the administrator.

Stage 330 can include receiving an administrator selection of a first graphical element corresponding to a first data connector. The administrator can select the graphical element by clicking or tapping the graphical element, for example. If the first graphical element is located within a tier, the administrator can select the tier to expand it as many levels as necessary to display the first graphical element and then select that element. In some examples, selecting the first graphical element can include clicking and holding the first graphical element, such as would be required for performing a drag-and-drop operation. Any other available GUI selection mechanism can be used, however. In some examples, the graphical element associated with the first data connector can change when it is selected. For example, the graphical element can be displayed in a different color, size, shape, font, or location after selection.

At stage 340, the system can receive an administrator selection of a common business object. In the drag-and-drop example, the administrator can select the common business object by dragging the first graphical element and dropping it on the common business object. In another example, the administrator can select the common business object by simply clicking or tapping on it. As with the selection of the data connector, selecting a common business object can cause the common business object to be displayed differently than before it was selected. For example, the common business object can be displayed in a different color, size, shape, font, or location after selection. The displayed difference in the graphical element representing the common business object can match, or correspond to, the displayed difference in the graphical element representing the data connector.

At stage 350, the system can map the first data connector to the selected common business object. The mapping can entail both a visual depiction as well a system change. Regarding the visual depiction, the GUI can utilize various schemes for visually indicating the mapping. In a first example, the GUI can color-match the mapped data connector and common business object. The color-match color can be the same as displayed during the selection process at stages 330 and 340, or can be a different color to indicate that the mapping has been completed. In another example, the GUI can display an additional graphical element relating the graphical elements of the data connector and common business object. An example additional graphical element is a line or arrow drawn on the GUI between the relevant graphical elements. Another example can include displaying a set of matching icons or badges on the mapped elements. Yet another example includes adding text next to one or both of the mapped elements, where the text provides an indication that mapping has occurred. The text can identify the corresponding mapped element.

At stage 360, the GUI can display an application template. The type of template displayed at this stage can depend on a variety of factors. In some example, the system provides an administrator with the option to build one of multiple types of applications, and each application type can include one or more templates. For example, an application for tracking sales information can provide a template designed to display relevant sales data in graphs or charts, while an application for handling administrative approvals can utilize a card-based template where each card corresponds to an approval request and includes buttons to approve or decline the request.

Similarly, different templates can be displayed based on the user group for which the application, or application version, is intended. A single application can include multiple application versions, each version intended to be used by users within one or more user groups. Using the example of a sales application, a first version can be created for sales associates. The sales associates can belong to a sales-associates group. That version of the application can utilize a template showing information relevant to the daily activities of a sales associate, such as their daily or weekly sales goals. Another version of the application, intended for users within a sales-management group, can utilize a template showing higher-level sales information that aggregates information across a department or across many customers. The different templates associated with different applications, or application versions, can be created and stored at the application server.

The particular template displayed at stage 360 can correspond to selections made by the administrator regarding the type of application or the type of user at issue. These selections are discussed further with respect to FIGS. 4 and 5.

The template displayed at stage 360 can include multiple fields. A field can include any area of a template at which content is to be displayed when the application executes. For example, a field can include a text box, a location for a graph, or a location for an image. When a user selects a template, the GUI can display graphical elements representing the fields within that template. In some examples, the GUI allows a user to select a portion of a template, in which case the GUI displays graphical elements representing the fields within the selected portion of the template.

Stage 370 can include receiving an administrator's selection of a first template field and a common business object. The selections can be made in a manner similar to the selections at stages 330 and 340. For example, a view of the GUI can display graphical elements representing fields of the template as well graphical elements representing common business objects. The administrator can click or tap a graphical element representing a field and then click or tap a graphical element representing a common business object in order to map the two to one another. Similarly, the administrator can drag and drop one of the graphical elements onto the other, mapping the corresponding field and common business object in that manner.

The GUI can communicate the requested mapping to the application server at stage 380. The application server can store the mapping, such as by storing an instruction to associate content of the selected common business object with the selected field of the application template. When the application executes at runtime, it can execute the instruction, retrieve content associated the common business object, and display that content in the appropriate field of the application.

Stage 390 can include generating the application. This stage can include generating or retrieving multiple components of code. The application server can store or access code snippets that accomplish particular tasks and then edit and combine those snippets as needed. For example, the generic code for mapping a data connector to a common business object can be stored at the application server. When generating the application, the application server can access the generic code and substitute a specific data connector and common business object into that piece of code. This process can be repeated for the various mappings provided by the console. A similar process can take place for the template selection, where the application server can access code representing one of multiple templates based on selections at the console. The application server can also access code implementing a particular visual theme, as selected at the console. The various snippets of code can be compiled into one functioning application (including, in some examples, multiple application versions for different user groups).

In some examples, "generating" the application includes modifying a previously generated application. For example, an administrator can use the console to make a small change or tweak to an existing application. When the administrator saves those changes or otherwise instructs the application server to implement the changes, the server can change only those portions of the application that have changed since the last build. For example, if the administrator only changes the visual theme, then the application server can substitute code portions that control the relevant visual aspects of the application without modifying the remaining code.

Figure 4:
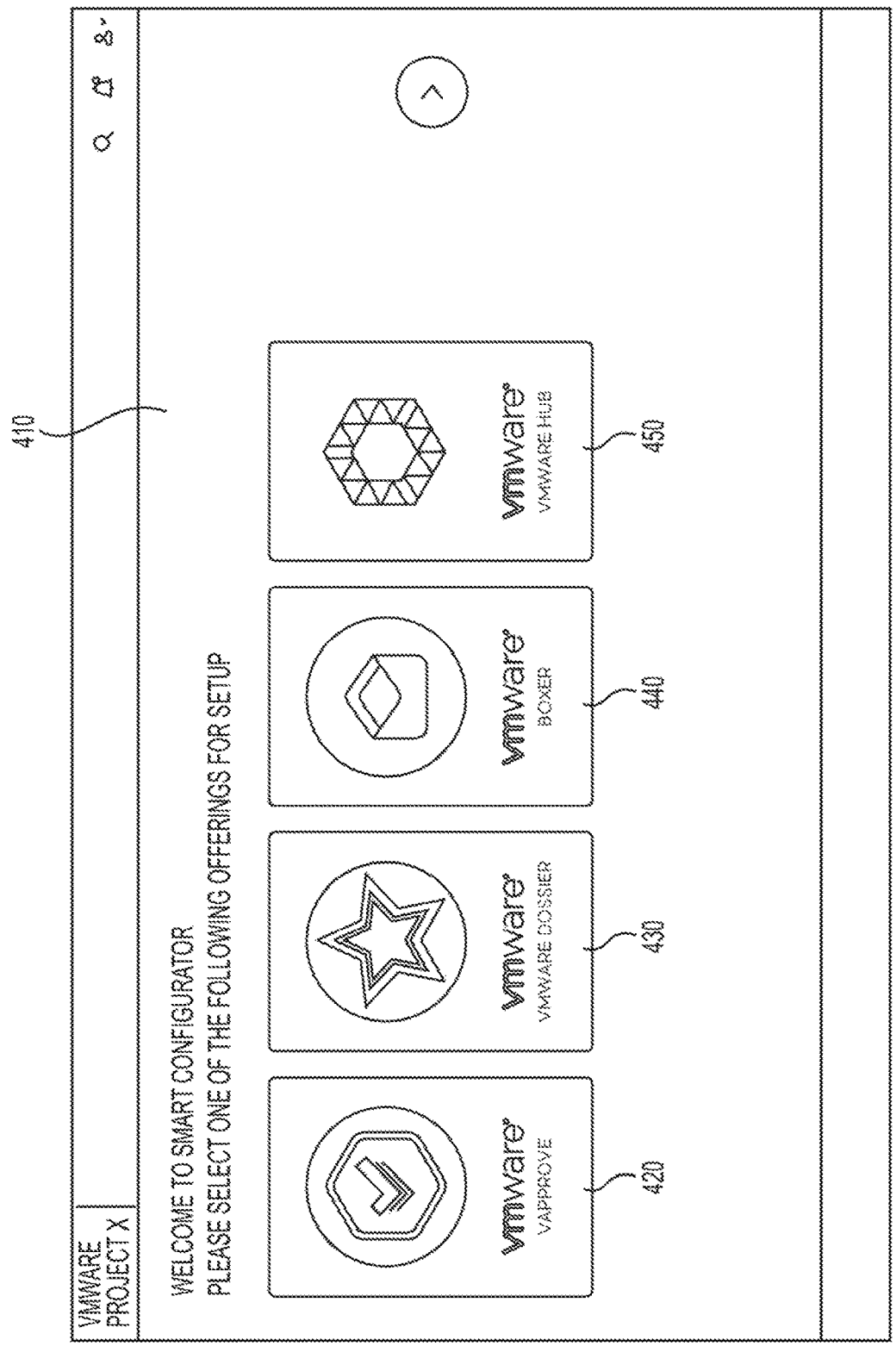
FIG. 4 is an illustration of an example GUI displayed at a console for building an application.

FIGS. 4-9 are illustrations of example GUIs for building an application. FIG. 4 provides an illustration of a GUI view 410 for selecting between various types of applications. In this example, four types of applications are provided: a "vApprove" application type 420, a "Dossier" application type 430, a "Boxer" application type 440 (BOXER being an email client offered by VMWARE), and a "VMware Hub" application type 450.

The "vApprove" application type 420 can correspond to an application primarily intended for approving or rejecting requests in an efficient manner. For example, a manager might be required to approve all expense requests from a group of employees. Traditional methods for performing this task are cumbersome. The application type 420 can consolidate the requests in one location and display relevant information with each request. The application type 420 can also provide buttons for the user to accept or reject the request.

The "Dossier" application type 430 can provide a helpful collection of information about customers or clients. For example, a sales associate can use the application type 430 to track sales, deadlines, goals, and other relevant information. The application type 430 can consolidate sales information from various sales-management applications such as SALESFORCE and VARICENT. A user can thereby access information across different platforms by interacting with a single application type 430.

The "Boxer" application type 440 can provide an email application that interfaces with various other applications or backends. The application type 440 can provide prompts or shortcuts for actions based on the content of a received email. For example, an email may ask the recipient for a status update regarding a project. The application type 440 can provide a prompt that includes data pulled from a data connector regarding the current status of the project.

The "VMware Hub" application type 450 can provide an application that provides information about a datacenter. The application type 450 can aggregate a wide variety of datacenter information, including the health status of servers or virtual machines, issues or alerts that are pending or recently fixed, memory and processor usage, and other related types of information. The application type 450 can utilize data connectors that pull data from a dedicated datacenter-monitoring service and format them in a convenient way.

The application types 420, 430, 440, and 450 are merely exemplary. Any application types can be offered. Each application type can include one or more different application templates that are designed to accommodate a particular type of workflow or assist with a particular type of job or activity. The application types, including the relevant application templates and visual themes included for each type, can be stored at the application server and accessed through the console.

Figure 5:
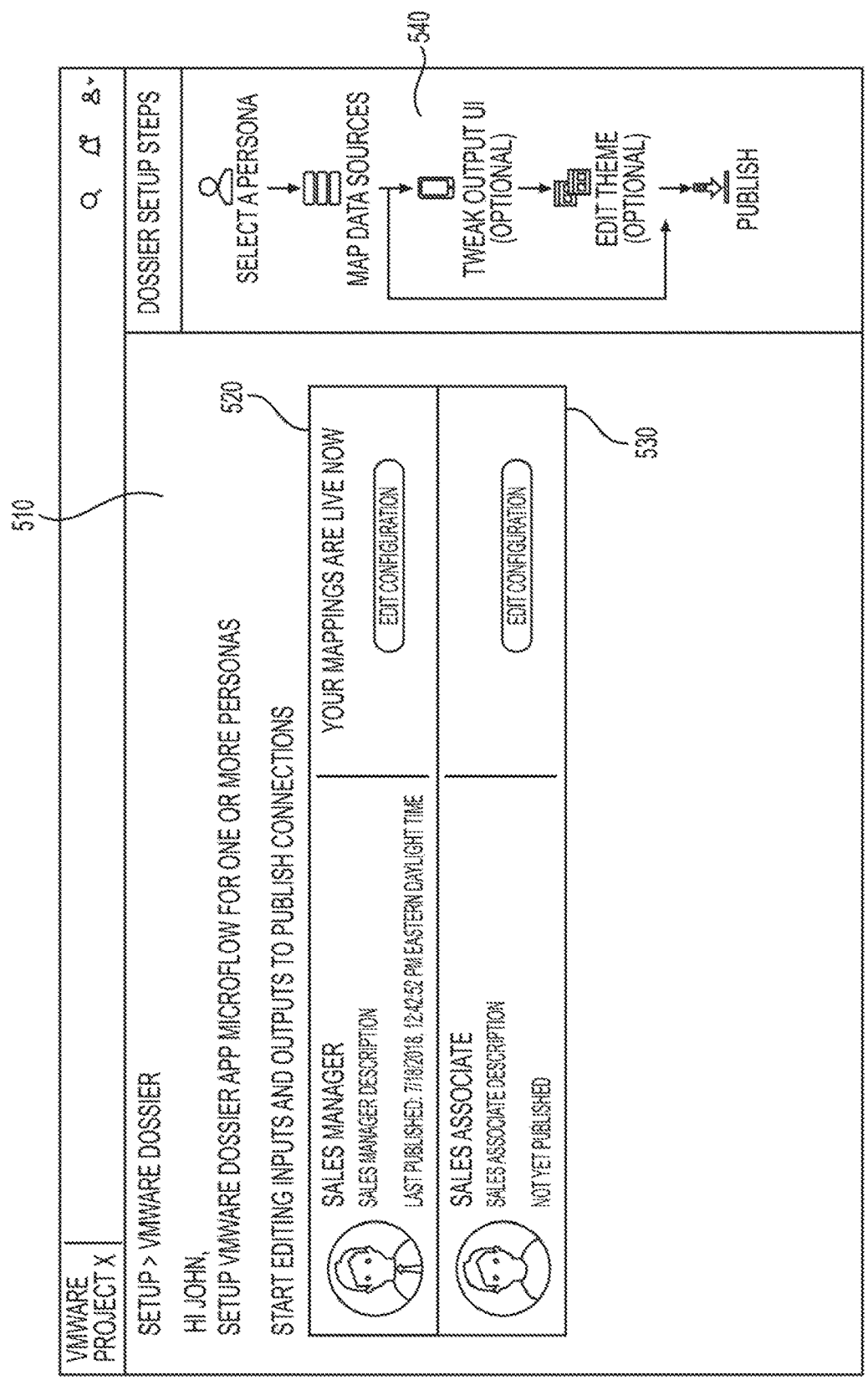
FIG. 5 is an illustration of an example GUI displayed at a console for building an application.

FIG. 5 shows an example GUI view 510 resulting from an administrator choosing the "Dossier" application type 430. The GUI view 510 includes an overview 540 of setup steps to help guide the administrator through the process of creating and publishing an application. The GUI view 510 also includes two options 520, 530 for creating different application versions based on user type. The first option 520 can create an application version for a sales manager. The GUI view 510 includes a name for the version (e.g., "Sales Manager") as well as a description of that version (e.g., "Sales Manager Description"). The GUI view also includes a button to edit the configurations of each version, as desired.

Figure 6:
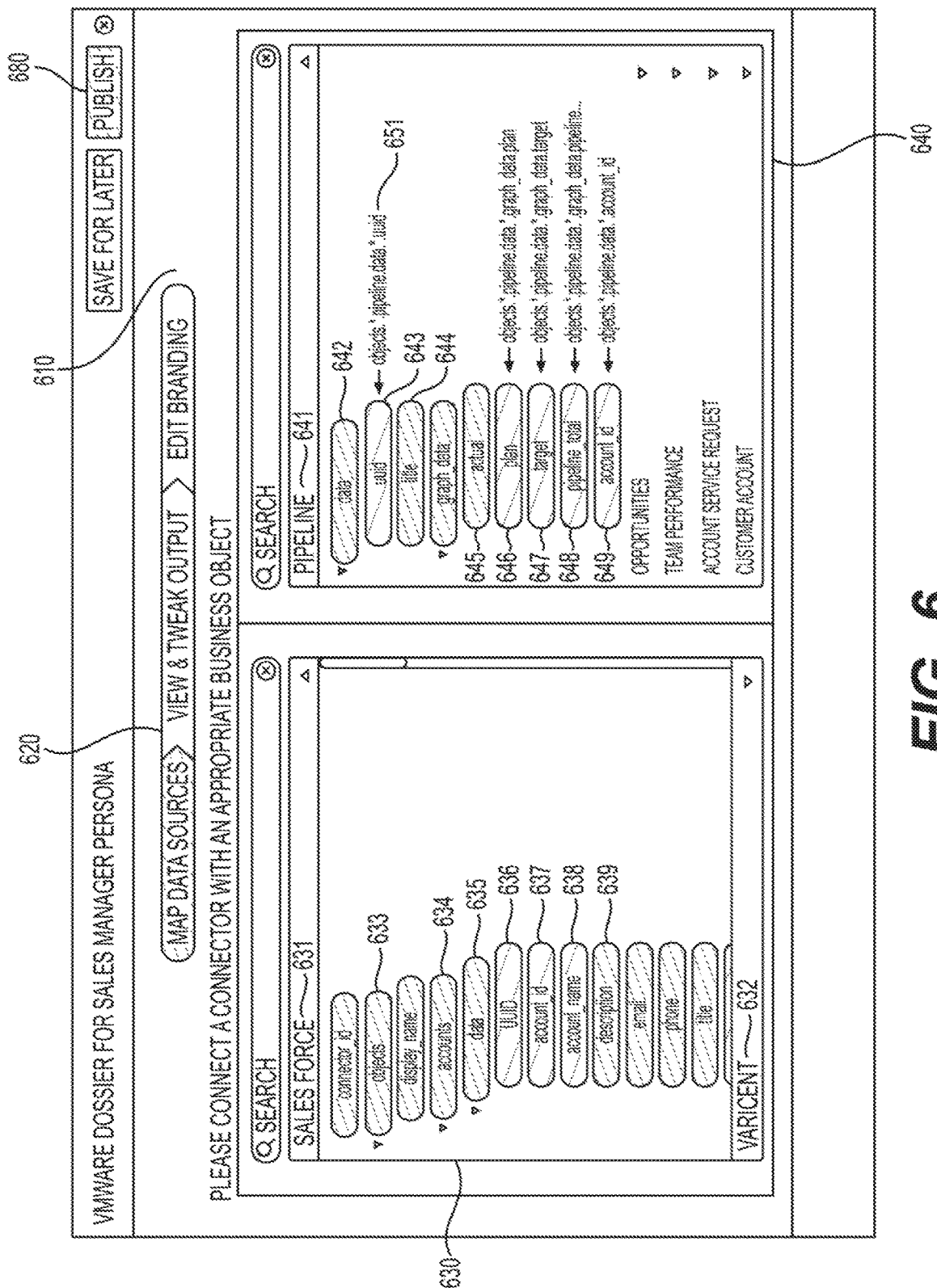
FIG. 6 is an illustration of an example GUI displayed at a console for building an application.

FIG. 6 shows an example GUI view 610 resulting from the administrator choosing the "edit configuration" button associated with the sales manager workflow of FIG. 5. The GUI view 610 includes a progress bar 620 that shows the stages of mapping data sources, viewing and tweaking output, and editing branding. In this example, the "map data sources" portion of the progress bar 620 is highlighted.

The GUI view 610 of FIG. 6 includes a first box 630 and a second box 640, each having multiple graphical elements within them. The first box 630 can display graphical elements representing data connectors, as described in previous examples. The first box 630 can include headings 631, 632 that group the data connectors based on their source. In this example, the first heading 631 includes data connectors from SALESFORCE, while the second heading 632 includes data connectors from VARICENT. Headings 631, 632 can be expanded or retracted by selecting the headings 631, 632 or by selecting the arrows associated with each heading 631, 632.

The data connectors can be arranged in a hierarchical manner, as shown in FIG. 6. For example, a graphical element 633 titled "objects," when selected, can show a variety of additional graphical element. The graphical element 633 can include an arrow next to it, indicating that the graphical element is expandable and includes multiple data connectors within it. Similarly, the graphical elements 634, 634 titled "accounts" and "data" are expandable as shown. Within the "data" element 635, multiple graphical elements are shown that directly correspond to data connectors. In this example, those graphical elements are titled "UUID" 636, "account_id" 637, "account_name" 638, and "description" 639, among others. Some of the graphical elements within the first box 630 are shaded differently than others, indicating that those graphical elements (636, 637, 638, 639) are currently mapped to one or more common business objects.

A similar format can be found in the second box 640, but the graphical elements of the second box 640 correspond to common business objects rather than data connectors. A "Pipeline" heading 641 is shown in an expanded format, while other headings ("Opportunities," "Team Performance," "Account Service Request," and "Customer Account") are displayed in a retracted format. Any of these headings can be expanded or retracted by selecting the arrows accompanying each heading.

Within the pipeline heading 641, multiple graphical elements are displayed in a hierarchical manner. For example, the graphical element 642 titled "data" is shown in an expanded state. Within that expanded set of elements, the graphical element 643 titled "uuid" is shown with a different shading as element 642, indicating a different color. The different color can be used to indicate that the graphical element 643 has been mapped to a data connector. In this example, several graphical elements (643, 646, 647, 648, and 649) are shaded to indicate respective mappings to data connectors. Graphical element 644 is shaded to indicate that no mapping has occurred.

The text associated with of those graphical elements provides further indication of the mapping. For example, a text blurb 651 appears next to graphical element 643, providing context indicating that the graphical element 643 is mapped to the "UUID" data connector 636 within the first box 630. Similar text blurbs are included for the remaining shaded graphical elements within the second text box 640. In some examples, the text blurb also includes an indication of the source of the data connector. In addition to the text blurbs, the GUI view 610 can include arrows (not shown) that extend between the relevant data connector and common business object.

Finally, the GUI view 610 can include a "Publish" button 680 for publishing the application when it is complete. In some examples, the button 680 remains grayed out or hidden until a later stage of the application-building process.

Figure 7:
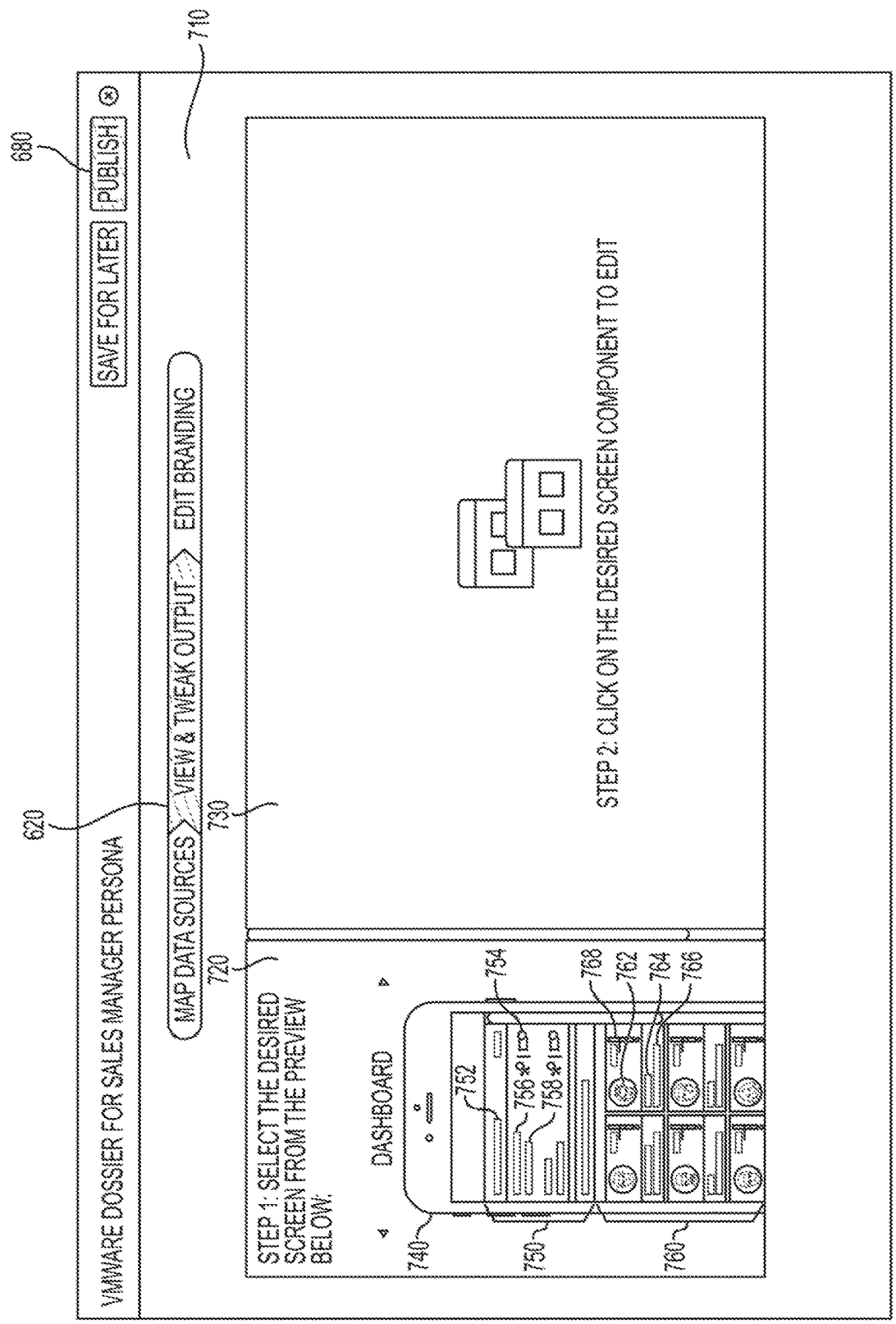
FIG. 7 is an illustration of an example GUI displayed at a console for building an application.

FIG. 7 shows another GUI view 710 for performing further steps for building the application. The GUI view 710 of FIG. 7 can be selected by using the progress bar 620 in one example. In another example, the GUI view 710 can be reached by selecting a graphical element in GUI view 610 indicating that the mappings are complete.

GUI view 710 includes a first box 720 and a second box 730. The first box 720 includes an instruction for the administrator to select a screen from the preview shown below. The preview can show an example application template 740 having various fields within it. The template 740 can include sections 750, 760 that are selectable by the administrator. In the example of FIG. 7, the first section 750 includes fields 752, 754, 756, and 758. These fields 752, 754, 756, and 758 can correspond to text, images, or icons. Although some of the fields 752, 756, 758 are depicted as boxes, they can also include example text, images, or icons. Similarly, the second section 760 includes a variety of cards that each feature multiple fields 768, 762, 764, and 766. The administrator can select between the first and second sections 750, 760 to edit that particular section, as indicated by the instruction in the second box 730.

Figure 8:
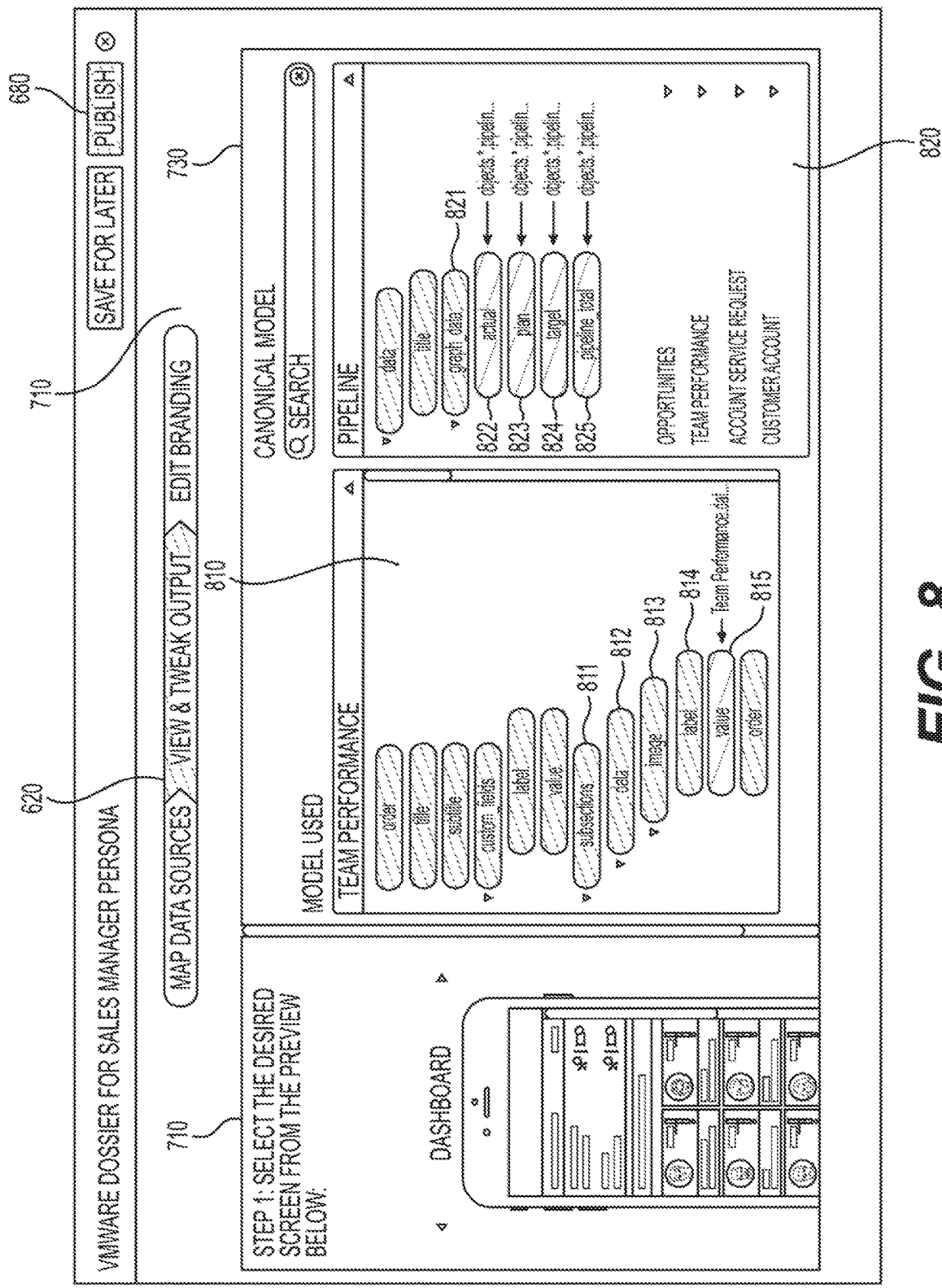
FIG. 8 is an illustration of an example GUI displayed at a console for building an application.

FIG. 8 shows the same GUI view 710 after the administrator has selected one of the first or second sections 750, 760 of the application template to edit. As explained above, a section 750, 760 of an application template can include multiple fields. In FIG. 8, those fields are depicted by graphical elements displayed in box 810. As with the graphical elements in previous GUI view 610, the graphical elements representing fields can be displayed in a hierarchical manner and can include colors or shading to indicate whether the graphical elements are mapped to a common business object. As in the previous GUI view 610, graphical elements can be displayed with an arrow next to them (e.g., graphical elements 811, 812, 813, 821), representing the expandable nature of the graphical element. Graphical element 814 is shown in the original shading or color, indicating that no mapping has occurred.

Graphical elements 821, 822, 823, 824, 825 representing common business objects can be displayed in the GUI view 710 at box 820. Common business objects that are mapped to a field can be shown by shading in the respective graphical element 822, 823, 824, 825. Those graphical elements 822, 823, 824, 825 can also include a text description, as shown. The text description can describe the common business object's mapping to a data connector, mapping to a template field, or both.

Figure 9:
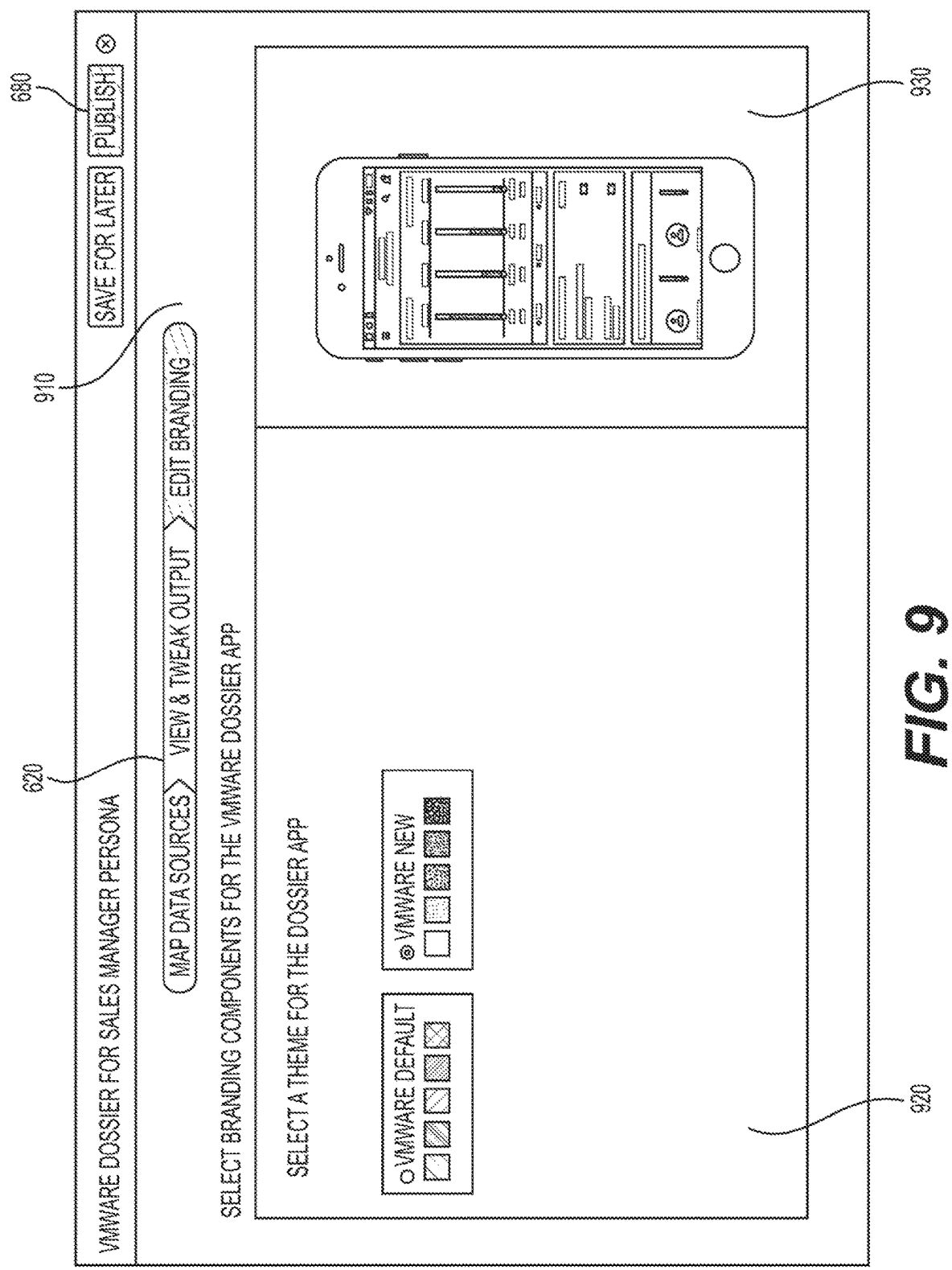
FIG. 9 is an illustration of an example GUI displayed at a console for building an application.
Figure 10:
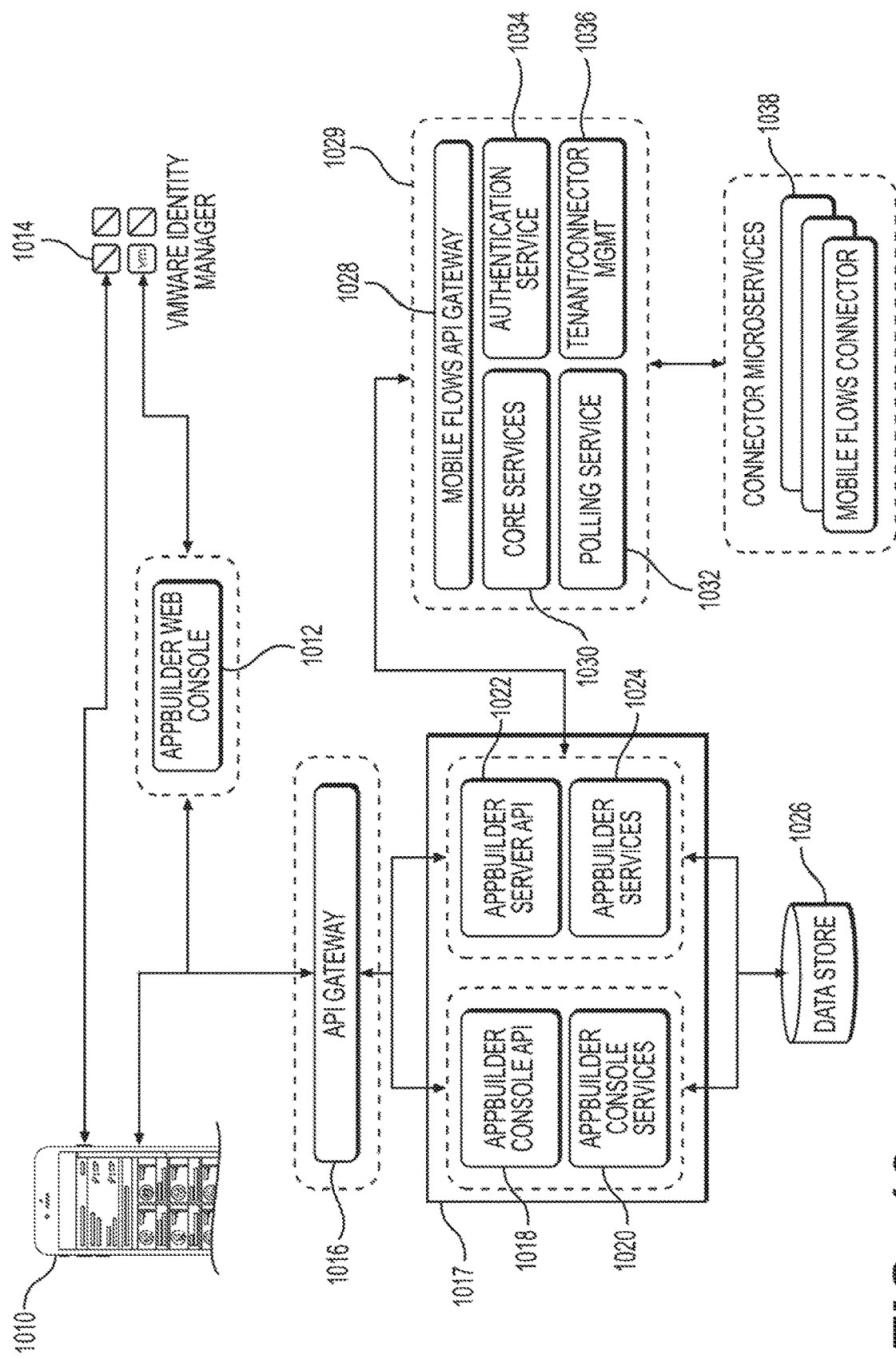
FIG. 10 is a system diagram of an example system for performing the example methods disclosed herein.

When the administrator is finished tweaking the output mappings, he or she can proceed to GUI view 910, shown in FIG. 9. This view 910 shows the progress bar 620 with the final stage ("Edit Branding") highlighted. In a first section 920, the GUI can provide options for visual themes available for the application. The visual theme options can apply to any portion of the application being built, such as the background color, text color, text size, text font, and the location of text or images or other fields. The GUI view 910 can also include an application preview 930 that displays an application GUI intended to mimic the GUI that will be displayed if the application were published with the selected theme and previously selected input and output mappings. This preview 930 can be displayed in other locations of other GUI views throughout the application-building process, in some examples.

FIG. 10 shows a system diagram of an example system for performing the example methods disclosed herein. The system can include a user device 1010 that executes an instance of an application built in accordance with the methods described above. The user device 1010 can be any computing device, such as a smartphone, laptop, tablet, personal computer, or workstation. The user device 1010 can include a non-transitory, computer-readable medium containing instructions that are executed by a processor. Example non-transitory, computer-readable mediums include RAM and ROM, disks, and other memory and storage that is accessible by a USB port, a floppy drive, CD-ROM or DVD-ROM drive, and a flash drive, among others.

The system can also include a console 1012, referred to in FIG. 10 as the "AppBuilder Web Console." The console 1012 can be a web-based GUI that can be displayed on any computing device. The console 1012 can require heightened authentication from an administrator and can allow the administrator to build an application using the various methods and GUIs described above.

The system can provide authentication services for the application on the user device 1010 and the web console 1012 through an identity management service 1014, such as vIDM. The identity management service 1014 can be a server, computing device, or network of multiple servers or computing devices, having one or more processors and memory stores. As explained in the "Authentication" section of this disclosure, the identity management service 1014 can utilize tokens, such as OAuth or JWT tokens, to authenticate a user at the user device 1010 or an administrator at the console 1012. In some examples, the identity management service 1014 can provide a token that persists on the user device 1010. When the user device 1010 makes requests to the application server 1017, it can include the token with the request.

Both the user device 1010 and console 1012 can communicate with an application server 1017 through an API gateway 1016. In some examples, the API gateway 1016 is part of the application server 1017. In other examples, the API gateway 1016 is a standalone server, computing device, or network of servers or computing devices. The API gateway 1016 can provide a single point of entry to the application server 1017 from the console 1012 or user device 1010.

The API gateway 1016 can also perform authentication, monitoring, load balancing, caching, request management, and response handling, as appropriate. The API gateway 1016 can also translate protocols, requests, and instructions between the application server 1017 and the console 1012 or user device 1010. When an application instance is executing on the user device 1010, it can update a data field by sending an API call to the API gateway 1016. The API gateway 1016 can pass the request to the application server 1017 (or component of the application server 1017), receive a response containing the requested data, format the data as needed, and return the response to the user device 1010.

Aside from potentially including the API gateway 1016, the application server 1017 can also include various API components and services for running and supporting the console 1012 and application instance executing on the user device 1010. For example, the application server 1017 can include a microservice flow that includes a console API 1018 and console services 1020. The console API 1018 can be used to communicate with the console 1012 through the API gateway 1016. The console API 1018 can receive and make API calls to and from the console 1012 to display and populate the various GUI views described above and shown in FIGS. 4-9. The console services 1020 component can perform backend processes to support the console 1012, such as by storing or retrieving data from the data store 1026.

The data store 1026 can be used to store mappings provided at the console 1012, authentication information, application types, application templates, data connector information, source information, and any other types of data communicated to or from a source, the console 1012, or an application instance on a user device 1010. The data store 1026 can be a part of the application server 1017 or it can be a standalone database. The data store 1026 can also be a virtual database that utilizes memory stores across a number of devices executing virtual machines.

The application server 1017 can also include a server microservice flow that includes a server API 1022 and server services 1024. The server API 1024 can be used to communicate with a data-connector source, either directly or through an intermediate server. The server API 1024 can receive and make API calls to and from a source, such as by requesting a list of available data connectors from a source. The server services 1024 component can perform backend processes to support the communications with the sources, such as by storing or retrieving data from the data store 1026.

The server microservice flow can communicate with a source by going through a mobile flows API gateway 1028. The mobile flows API gateway 1028 is an API gateway that handles API calls to and from a source. This can include, for example, receiving a list of available data connectors from a source, receiving a notification that new data is available for a connector, retrieving the new data for the connector, or any other relevant communications. The mobile flows API gateway 1028 can be a part of the application server 1017 or a standalone server, such as a mobile flows server 1029.

The mobile flows API gateway 1028 can work in tandem with components for providing specific services. For example, a core services component 1030 can manage or modify settings for the various components of the mobile flows server 1029. The core services component 1030 can also handle load balancing, connection brokering, processing, licensing, and any other services not already being handled by the other components of the mobile flows server 1029.

A polling service 1032 can handle retrieving or requesting data for a data connector. For example, the polling service 1032 can set a regular polling time, such as 1 minute, after which the polling service causes the mobile flows API gateway 1028 to send a request to the source to update one or more data connectors. In examples where the source provides a notification that an update is available, that notification can be processed by the polling service 1032.

An authentication service 1034 can provide authentication credentials to the source to authenticate the request. The authentication service 1034 can retrieve a token, previously provided to the API gateway 1016 by the user device 1010 or console 1012 as part of a communication to the application server 1017, and provide that token to the source. The token can authenticate the system to the source.

A connector management service 1036 can also be provided. The connector management service 1036 can track the data connectors associated with each source and identify a source when a data connector needs to be updated. For example, the user device 1010 can send a request to the application server 1017 to update a particular data connector. The request can be routed to the connector management service 1036, which can use a lookup table to determine the particular source for which that data connector is associated. A request can then be generated by the core services 1030 or mobile flows API gateway 1028 and passed to the source.

The source can include a mobile flows connector 1038, referred to throughout this disclosure as a "data connector." The mobile flows connector 1038 can be part of a connector microservice executing on a server managed by the source. The mobile flows connector 1038 can communicate with the mobile flows API gateway 1028. The mobile flows connector 1038 can also authenticate requests and respond with relevant data as desired.

Other examples of the disclosure will be apparent to those skilled in the art from consideration of the specification and practice of the examples disclosed herein. Though some of the described methods have been presented as a series of steps, it should be appreciated that one or more steps can occur simultaneously, in an overlapping fashion, or in a different order. The order of steps presented are only illustrative of the possibilities and those steps can be executed or performed in any suitable fashion. Moreover, the various features of the examples described here are not mutually exclusive. Rather any feature of any example described here can be incorporated into any other suitable example. It is intended that the specification and examples be considered as exemplary only, with a true scope and spirit of the disclosure being indicated by the following claims.

What is claimed is:

1. A method for building an application at a computing device having a hardware processor and a memory store, the method comprising:

causing a graphical user interface (GUI) to display a plurality of selectable options each corresponding to a different application type, wherein one of the selectable options corresponds to an email application type;

receiving, at the computing device, a selection of one of the plurality of selectable options;

receiving a plurality of user groups from a management server and causing the GUI to display the plurality of user groups for selection;

receiving a selection of a user group of the plurality of user groups;

identifying a first data connector from a first source, wherein the first data connector is associated with an Application Programming Interface (API) provided by the first source;

associating the first data connector with a first common business object;

providing an application template comprising a plurality of data fields, the application template being based on at least the selected application type and the selected user group;

associating a first data field of the plurality of data fields with the first common business object;

publishing a first version of an application that includes the application template and the first data field, the first version of the application being associated with a first user group;

publishing a second version of the application that includes the application template and the first data field, the second version of the application being associated with a second user group; and causing the first or second version of the application to be installed on a user device according to whether the user of the user device is assigned to the first user group or second user group, wherein the application displays data received from the first data connector at the first data field, and wherein the published application executes on a user device remote from the computing device.

2. The method of claim 1, wherein the application, when executed, retrieves data associated with the first data connector from the first source and displays at least a portion of the received data in the first data field.

3. The method of claim 1, further comprising receiving a selection of a visual theme that determines at least the color and formatting of the application, wherein publishing the application is performed according to the selected visual theme.

4. The method of claim 1, wherein associating the first data connector with the first common business object is based on at least one user selection.

5. The method of claim 1, wherein associating the first data connector with the first common business object is performed automatically based on attributes associated with the first data connector and attributes associated with the first common business object.

6. The method of claim 1, further comprising publishing a first version of the application associated with a first user group;

publishing a second version of the application associated with a second user group; and installing the first or second version of the application a user device based on whether the user of the user device is assigned to the first user group or second user group.

7. The method of claim 1, wherein the options for different application types are presented on a first GUI page and the plurality of user groups for selection are presented on a second GUI page different than the first GUI page.

8. A non-transitory, computer-readable medium comprising instructions that, when executed by a processor of a computing device, perform stages for building an application, the stages comprising:
causing a graphical user interface (GUI) to display a plurality of selectable options each corresponding to a different application type, wherein one of the selectable options corresponds to an email application type;
receiving, at the computing device, a selection of one of the plurality of selectable options;
receiving a plurality of user groups from a management server and causing the GUI to display the plurality of user groups;
receiving a selection of a user group of the plurality of user groups;
identifying a first data connector from a first source, wherein the first data connector is associated with an Application Programming Interface (API) provided by the first source;
associating the first data connector with a first common business object;
providing an application template comprising a plurality of data fields, the application template being based on at least the selected application type and the selected user group;
associating a first data field of the plurality of data fields with the first common business object; and
publishing a first version of an application that includes the application template and the first data field, the first version of the application being associated with a first user group;
publishing a second version of the application that includes the application template and the first data field, the second version of the application being associated with a second user group; and
causing the first or second version of the application to be installed on a user device according to whether the user of the user device is assigned to the first user group or second user group,
wherein the application displays data received from the first data connector at the first data field, and
wherein the published application executes on a user device remote from the computing device.

9. The non-transitory, computer-readable medium of claim 8, wherein the application, when executed, retrieves data associated with the first data connector from the first source and displays at least a portion of the received data in the first data field.

10. The non-transitory, computer-readable medium of claim 8, the stages further comprising receiving a selection of a visual theme that determines at least the color and formatting of the application, wherein publishing the application is performed according to the selected visual theme.

11. The non-transitory, computer-readable medium of claim 8, wherein associating the first data connector with the first common business object is based on at least one user selection.

12. The non-transitory, computer-readable medium of claim 8, wherein associating the first data connector with the first common business object is performed automatically based on attributes associated with the first data connector and attributes associated with the first common business object.

13. The non-transitory, computer-readable medium of claim 8, the stages further comprising:
publishing a first version of the application associated with a first user group;
publishing a second version of the application associated with a second user group; and
installing the first or second version of the application a user device based on whether the user of the user device is assigned to the first user group or second user group.

14. The non-transitory, computer-readable medium of claim 8, wherein the options for different application types are presented on a first GUI page and the plurality of user groups for selection are presented on a second GUI page different than the first GUI page.

15. A system for building an application, comprising:
an application server having a processor and memory storage;
wherein the memory storage contains a non-transitory, computer-readable medium comprising instructions that, when executed by the processor, carry out stages comprising:
causing a graphical user interface (GUI) to display a plurality of selectable options each corresponding to a different application type, wherein one of the selectable options corresponds to an email application type;
receiving, at the application server, a selection of one of the plurality of selectable options;
receiving a plurality of user groups from a management server and causing the GUI to display the plurality of user groups;
receiving a selection of a user group of the plurality of user groups;
identifying a first data connector from a first source, wherein the first data connector is associated with an Application Programming Interface (API) provided by the first source;
associating the first data connector with a first common business object;
providing an application template comprising a plurality of data fields, the application template being based on at least the selected application type and the selected user group;
associating a first data field of the plurality of data fields with the first common business object; and
publishing a first version of an application that includes the application template and the first data field, the first version of the application being associated with a first user group;
publishing a second version of the application that includes the application template and the first data field, the second version of the application being associated with a second user group; and
causing the first or second version of the application to be installed on a user device according to whether the user of the user device is assigned to the first user group or second user group,
wherein the application displays data received from the first data connector at the first data field, and
wherein the published application executes on a user device remote from the application server.

16. The system of claim 15, wherein the application, when executed, retrieves data associated with the first data connector from the first source and displays at least a portion of the received data in the first data field.

17. The system of claim 15, the stages further comprising receiving a selection of a visual theme that determines at least the color and formatting of the application, wherein publishing the application is performed according to the selected visual theme.

18. The system of claim 15, wherein associating the first data connector with the first common business object is based on at least one user selection.

19. The system of claim 15, wherein associating the first data connector with the first common business object is performed automatically based on attributes associated with the first data connector and attributes associated with the first common business object.

* * * * *